United States Patent
Yu et al.

(10) Patent No.: US 11,616,376 B2
(45) Date of Patent: Mar. 28, 2023

(54) ENERGY STORAGE SYSTEM AND METHOD FOR CAPACITY EXPANSION THEREOF

(71) Applicant: Sungrow Power Supply Co., Ltd., Hefei (CN)

(72) Inventors: Yanfei Yu, Anhui (CN); Xiaoxun Li, Anhui (CN); Zhifei Zhang, Anhui (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 0 days.

(21) Appl. No.: 17/363,265

(22) Filed: Jun. 30, 2021

(65) Prior Publication Data

US 2022/0006302 A1 Jan. 6, 2022

(30) Foreign Application Priority Data

Jul. 2, 2020 (CN) .......................... 202010633967.9

(51) Int. Cl.
*H02J 3/32* (2006.01)
*H02J 7/00* (2006.01)

(52) U.S. Cl.
CPC ................................. *H02J 7/0014* (2013.01)

(58) Field of Classification Search
USPC .......................................................... 307/19
See application file for complete search history.

(56) References Cited

U.S. PATENT DOCUMENTS

| | | | |
|---|---|---|---|
| 11,271,255 B2 * | 3/2022 | Vickery | B60L 53/68 |
| 2005/0121979 A1 | 6/2005 | Matsumoto et al. | |
| 2021/0351597 A1 * | 11/2021 | Yang | H05K 7/1492 |

FOREIGN PATENT DOCUMENTS

| | | | |
|---|---|---|---|
| CN | 106711526 A | | 5/2017 |
| CN | 106712125 | * | 5/2017 |
| CN | 106712125 A | | 5/2017 |
| CN | 110932298 A | | 3/2020 |
| EP | 2 330 726 A2 | | 6/2011 |
| EP | 2 330 726 A3 | | 10/2015 |
| JP | 2001-157380 A | | 6/2001 |
| JP | 2013078227 | * | 4/2013 |

OTHER PUBLICATIONS

Extended European Search Report for European Application No. 21182884.3, dated Nov. 22, 2021.
EP21182884.3, Nov. 22, 202, Extended European Search Report.

* cited by examiner

*Primary Examiner* — Toan T Vu
*Assistant Examiner* — Xuan Ly
(74) *Attorney, Agent, or Firm* — Wolf, Greenfield & Sacks, P.C.

(57) ABSTRACT

A method for capacity expansion of an energy storage system and an energy storage system are provided. The method is applied to a controller in the energy storage system. The controller acquires a value of a characteristic parameter of a to-be-added second energy storage device as a target characteristic value. Then, the controller controls a charge/discharge power converter to charge or discharge first energy storage devices until a proximity of a value of a characteristic parameter of at least one first energy storage device to the target characteristic value is less than a preset proximity. Finally, a signal indicating that the second energy storage device is allowed to be connected into the energy storage system is generated and outputted to notify an operator.

15 Claims, 7 Drawing Sheets

ENERGY STORAGE SYSTEM AND METHOD FOR CAPACITY EXPANSION THEREOF

This application claims the priority to Chinese Patent Application No. 202010633967.9, titled "ENERGY STORAGE SYSTEM AND METHOD FOR CAPACITY EXPANSION THEREOF", filed on Jul. 2, 2020 with the Chinese Patent Office, which is incorporated herein by reference in its entirety.

FIELD

The present disclosure relates to the field of electrical and electronic technologies, and in particular to an energy storage system and a method for capacity expansion thereof.

BACKGROUND

In an energy storage system that includes a storage battery, the storage battery is connected to an external power supply or a load via a charge/discharge power converter, and is able to discharge towards the external power supply or the load, and accept charging from the external power supply.

Considering the cost, it is a usual option to first select a storage battery that has a capacity required at present, and then add another storage battery to expand the energy storage system in the future when the load increases or the price of the storage battery decreases.

However, in the existing solution for capacity expansion, an additional charger or discharger are used to charge or discharge the storage battery to be added, so that the storage battery to be added can be added to the energy storage system when meeting an expansion requirement. Such solution causes problems of high cost and complication of the capacity expansion of an energy storage system.

SUMMARY

In view of the above, a method for capacity expansion of an energy storage system and an energy storage system are provided in the present disclosure, which can solve the problems of high cost and complication of capacity expansion of an energy storage system.

The following technical solutions are provided according to the embodiments of the present disclosure.

In an aspect, a method for capacity expansion of an energy storage system is provided in the present disclosure. The method is applied to a controller in the energy storage system. The energy storage system further includes one or more first energy storage device, a charge/discharge power converter, and one or more second energy storage device to be added into the energy storage system. The one or more second energy storage device have a same value of a characteristic parameter. The method for capacity expansion of an energy storage system includes: acquiring the value of the characteristic parameter of the second energy storage devices as a target characteristic value; controlling the charge/discharge power converter to charge or discharge the first energy storage devices until a proximity of a value of the characteristic parameter of at least one of the first energy storage devices to the target characteristic value is less than a preset proximity; and generating and outputting a signal indicating that the second energy storage devices are allowed to be connected into the energy storage system.

In an embodiment, in a case that each of the second energy storage devices comprises one energy storage module, and each of the first energy storage devices comprises one storage module or at least two storage modules connected in series, and the second energy storage devices are to be added by serial connection, the controlling the charge/discharge power converter to charge or discharge the first energy storage devices until a proximity of a value of the characteristic parameter of at least one of the first energy storage devices to the target characteristic value is less than a preset proximity includes: controlling the charge/discharge power converter to charge or discharge the first energy storage devices until the proximity of the value of the characteristic parameter of at least one energy storage module in at least one of the first energy storage devices to the target characteristic value is less than the preset proximity.

In an embodiment, in a case that one of the first energy storage devices comprises at least two energy storage modules connected in series, the value of the characteristic parameter of each of the energy storage modules in the first energy storage device is acquired by: communicating with a management system in the first energy storage device; or equally averaging the value of the characteristic parameter of the first energy storage device over the energy storage modules and taking the averaged value as the value of the characteristic parameter of one energy storage module.

In an embodiment, in a case that the second energy storage devices are to be added by parallel connection, the controlling the charge/discharge power converter to charge or discharge the first energy storage devices until a proximity of a value of the characteristic parameter of at least one of the first energy storage devices to the target characteristic value is less than a preset proximity includes: controlling the charge/discharge power converter to charge or discharge the first energy storage devices until the proximity of the value of the characteristic parameter of each of first energy storage devices to be connected in parallel with the second energy storage devices, to the target characteristic value is less than the preset proximity.

In an embodiment, the first energy storage devices and the second energy storages device are storage batteries, and the characteristic parameter is at least one of voltage, battery capacity, and state of charge (SOC).

In an embodiment, the proximity is an absolute value of difference, and the preset proximity is a preset threshold.

In an embodiment, in a case that the characteristic parameter is voltage, whether the proximity of values of the characteristic parameter of the first energy storage devices to the target characteristic value is less than the preset proximity is determined by: performing, in a preset time period, a least square calculation on differences between the values of the characteristic parameter of the first energy storage devices and the target characteristic value; determining whether a curve showing change of a result of the least square calculation over time reaches an inflection point; and determining that the proximity is less than the preset proximity if the curve reaches the inflection point.

In an embodiment, in a case that the characteristic parameter is battery capacity or SOC, the target characteristic value is obtained from factory-provided information of the second energy storage devices.

In an embodiment, the factory-provided information includes the characteristic parameter, or includes the characteristic parameter, date of production and a formula for calculating the characteristic parameter over time.

In an embodiment, the controlling the charge/discharge power converter to charge or discharge the first energy storage devices includes: controlling the charge/discharge power converter to charge one of the first energy storage devices if a value of the characteristic parameter of the first energy storage device is less than the target characteristic value; and controlling the charge/discharge power converter to discharge one of the first energy storage device if a value of the characteristic parameter of the first energy storage device is greater than the target characteristic value.

In an embodiment, the method further includes controlling, after the second energy storage devices are added into the energy storage system, the charge/discharge power converter to perform deep charge/discharge and SOC re-calibration on the first energy storage devices and the added second energy storage devices.

In another aspect, an energy storage system is provided in the present disclosure, including: a controller, a first energy storage device, a charge/discharge power converter, and a second energy storage device which is to be added into the energy storage system. The first energy storage device is connected to a direct current (DC) side of the charge/discharge power converter. The controller is in a communication connection with the charge/discharge power converter, and the controller is configured to execute the above-mentioned method for capacity expansion of an energy storage system, to add the second energy storage device into the energy storage system.

In an embodiment, in a case that the charge/discharge power converter is a DC/AC converter, another side of the charge/discharge power converter is an alternating current AC side connected to an AC power supply and/or an AC load.

In an embodiment, in a case that the charge/discharge power converter is a DC/DC converter, another side of the charge/discharge power converter is a DC side connected to a DC power supply and/or a DC load via another DC/DC converter, and/or another side of the charge/discharge power converter is a DC side connected to an AC power supply and/or an AC load via a DC/AC converter.

In an embodiment, the DC power supply is a photovoltaic module or an energy storage device.

In an embodiment, the AC power supply is a power grid or an AC generator.

In an embodiment, the controller is an internal controller of the charge/discharge power converter, or a system controller.

Based on the above technical solutions, a method for capacity expansion of an energy storage system is provided. The method is applied to a controller in the energy storage system. In a process of the capacity expansion, at least one to-be-added second energy storage device having a same characteristic parameter is involved. The controller acquires a value of the characteristic parameter of the second energy storage device as a target characteristic value. Then, the controller controls the charge/discharge power converter to charge or discharge the first energy storage device until a proximity of a value of a characteristic parameter of at least one first energy storage device to the target characteristic value is less than a preset proximity, that is at least one first energy storage device is approximately in a same state as the to-be-add second energy storage device. Finally, a signal indicating that the second energy storage device is allowed to be connected into the energy storage system is generated and outputted to notify an operator. The process of capacity expansion completes when the operator finishes the capacity expansion in response to the notification. In the process of capacity expansion by applying the above-mentioned method for capacity expansion, only the charge/discharge power converter that is originally installed in the energy storage system is used to add the second energy storage device into the energy storage system to perform capacity expansion. Therefore, the method for capacity expansion of the energy storage system can reduce cost for capacity expansion of the energy storage system, and simplify a plan for capacity expansion of the energy storage system.

BRIEF DESCRIPTION OF THE DRAWINGS

In order for a more clear illustration of technical solutions in embodiments of the present disclosure or in the conventional technology, the drawings to be used in the description of the embodiments or the conventional technology are briefly described below. Apparently, the drawings in the following description show only some embodiments of the present disclosure, and those skilled in the art may obtain other drawings from the drawings without any creative effort.

DETAILED DESCRIPTION OF EMBODIMENTS

Technical solutions in embodiments of the present disclosure are clearly and completely described below in conjunction with the drawings of the embodiments of the present disclosure. Apparently, the embodiments described in the following are only some embodiments of the present disclosure, rather than all of the embodiments. Any other embodiments obtained by those skilled in the art based on the embodiments in the present disclosure without any creative effort shall fall within the protection scope of the present disclosure.

The relationship terms such as "first", "second" and the like herein are only used herein to distinguish one entity or operation from another, rather than to necessitate or imply existence of an actual relationship or order between the entities or operations. Furthermore, terms "include", "comprise" or any other variants thereof are intended to be non-exclusive. Therefore, a process, method, article or device including a series of elements includes not only the elements but also other elements that are not enumerated or other elements inherent to such process, method, article or device. Unless expressively limited otherwise, a process, method, article or device limited by "comprising/including a(n) . . . " does not exclude existence of another identical element in such process, method, article or device.

In order to solve the problems of high cost and complication of capacity expansion of an energy storage system, a method for capacity expansion of an energy storage system is provided in the present disclosure, which is applied to a controller included in the energy storage system. The energy storage system further includes: a first energy storage device, a charge/discharge power converter, and a second energy storage device that is to be added.

The first energy storage device is connected to a direct current DC side of a corresponding charge/discharge power converter. The second energy storage device is to be added to the energy storage system. The number of the first energy storage device and the number of the second energy storage device may depend on specific conditions, and are not limited herein, and all shall fall within the protection scope of the present disclosure. In a process of the capacity expansion, a method for capacity expansion as described below is performed for each to-be-added second energy storage device or a group of to-be-added second energy storage devices having a same value of a characteristic parameter.

Figure 1:
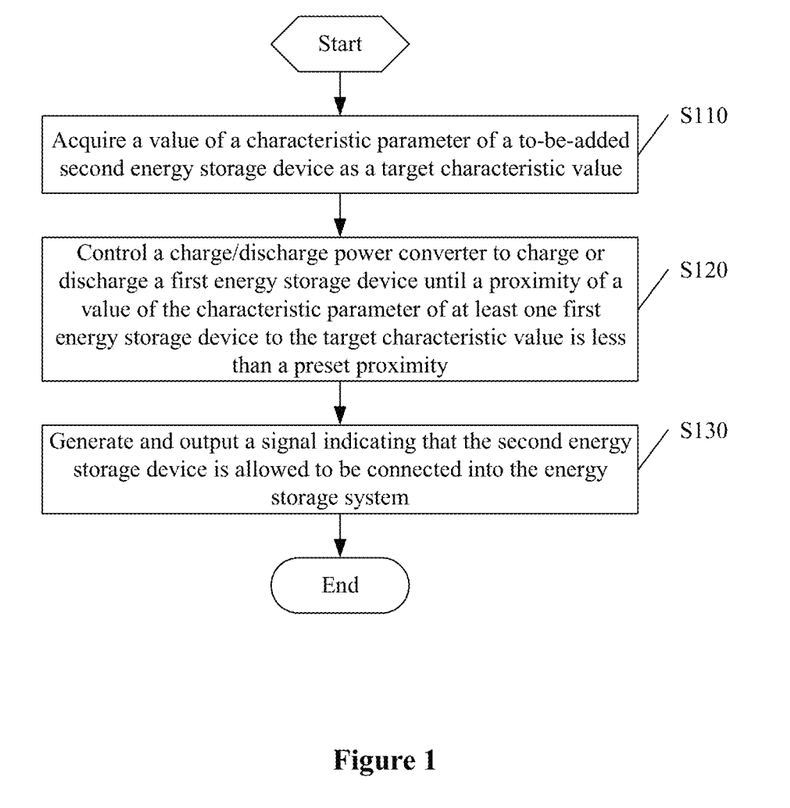
FIG. 1 is a schematic flowchart of a method for capacity expansion of an energy storage system according to an embodiment of the present disclosure.

A process of the method for capacity expansion of the energy storage system is shown in FIG. 1, including steps S110 to S130.

In step S110, a value of the characteristic parameter of the to-be-added second energy storage device is acquired as a target characteristic value.

It should be noted that the method for capacity expansion according to the embodiment cannot be performed when the controller is in an operating mode of controlling the energy storage system to work normally, but can be performed only when the controller is switched to a capacity expansion mode. The method starts from step S110.

An operator may switch the operating mode of the controller in the energy storage system by means of human-computer interaction. The human-computer interaction may be performed by a button, an LCD (Liquid crystal display) screen or a touch screen provided on the energy storage system, or by wireless communication through a mobile terminal or a computer terminal, which depends on an actual application and is not limited herein, and all shall fall within the protection scope of the present disclosure.

In some embodiments, each of the first energy storage device and the second energy storage device is a storage battery. In some embodiments, the characteristic parameter may be at least one of voltage, battery capacity, and state of charge (SOC), which may depend on an actual condition and is not limited herein, and all shall fall within the protection scope of the present disclosure.

It should be noted that in the energy storage system, when the first energy storage device and the to-be-added second energy storage device are at different levels of usage, comparison of voltage of the first energy storage device and the to-be-added second energy storage device may be significantly different from comparison of battery capacity thereof, and the comparison of voltage of the first energy storage device and the to-be-added second energy storage device may be significantly different from comparison of SOC thereof. Therefore, the characteristic parameter is preferably battery capacity or SOC, so as to ensure that the energy storage system after capacity expansion outputs with its maximum capacity.

In S120, the charge/discharge power converter is controlled to charge or discharge the first energy storage device until a proximity of a value of a characteristic parameter of at least one first energy storage device to the target characteristic value is less than a preset proximity.

The charge/discharge power converter mentioned in step S120 refers to the charge/discharge power converter to be connected to the second energy storage device in the method for capacity expansion. The first energy storage device mentioned in step S120 refers to the first energy storage device that is originally connected to the charge/discharge power converter.

It should be noted that the controller can directly use the characteristic parameter when switched to the capacity expansion mode, if the charge/discharge power converter measures the characteristic parameter of the first energy storage device in a real time manner and uploads the characteristic parameter to the controller through communication therebetween when the energy storage system is working normally. However, if the charge/discharge power converter does not measure or upload the characteristic parameter of the first energy storage device in real time when the energy storage system is working normally, the controller cannot directly use the characteristic parameter when switched to the capacity expansion mode. In this case, it is required to control the charge/discharge power converter to measure the characteristic parameter of the first energy storage device.

In step S120, the controlling the charge/discharge power converter to charge or discharge the first energy storage device specifically includes that: the controller controls the charge/discharge power converter to charge the first energy storage device if the value of the characteristic parameter of the first energy storage device is less than the target characteristic value; and the controller controls the charge/discharge power converter to discharge the first energy storage device if the value of the characteristic parameter of the first energy storage device is greater than the target characteristic value.

It should be noted that a value of the characteristic parameter of the first energy storage device may be considered as being equal to the target characteristic value if the proximity of the value of the characteristic parameter of the first energy storage device to the target characteristic value is less than the preset proximity. When meeting this condition, the capacity expansion of adding the second energy storage device into the energy storage system does not affect the energy storage system, thereby ensuring that the expanded energy storage system works smoothly and regularly.

In step S130, a signal indicating that the second energy storage device is allowed to be connected into the energy storage system is generated and outputted.

The signal indicating that the second energy storage device is allowed to be connected into the energy storage system may be present to an operator by means of human-computer interaction. The human-computer interaction may be performed by an indicator light or alarm bell, an LCD screen or touch screen, or wireless communication through a mobile terminal or computer terminal, or any other device, terminal or circuit that can present the signal, which depends on a specific application and is not limited herein, and all shall fall within the protection scope of the present disclosure.

Based on the above, in the process of capacity expansion by applying the above-mentioned method for capacity expansion, only the original charge/discharge power converter in the energy storage system is used to charge or discharge the energy storage system, making a state of at least one first energy storage device in the energy storage system the same as that of the second energy storage device, so as to add the second energy storage device is added into the energy storage system to perform capacity expansion. Therefore, the above method can reduce the cost and complication of capacity expansion of the energy storage system.

In practical applications, when the second energy storage device is added into the energy storage system, the controller may further control the charge/discharge power converter to perform deep charge/discharge and SOC re-calibration on the first energy storage device and the added second energy storage device, to obtain more accurate SOC of the energy storage devices after capacity expansion, so as to facilitate battery management and energy management. After that, the second energy storage device that has been added into the energy storage system may be marked as a first energy storage device, and the above-mentioned method for capacity expansion is performed repeatedly to add other second energy storage devices until all the second energy storage devices are added into the energy storage system.

Regarding step S120 in the above embodiment, two methods of determining whether the proximity of a value of the characteristic parameter of the first energy storage device to the target characteristic value is less than a preset proximity are provided in another embodiment of the present disclosure.

In one method, the proximity is an absolute value of difference between the value of the characteristic parameter of the first energy storage device and the target characteristic value, and the preset proximity is a preset threshold. Therefore, the determining whether the proximity of a value of the characteristic parameter of the first energy storage device to the target characteristic value is less than a preset proximity includes determining whether the absolute value of a difference between the value of the characteristic parameter of the first energy storage device and the target characteristic value is less than a preset threshold.

Figure 2:
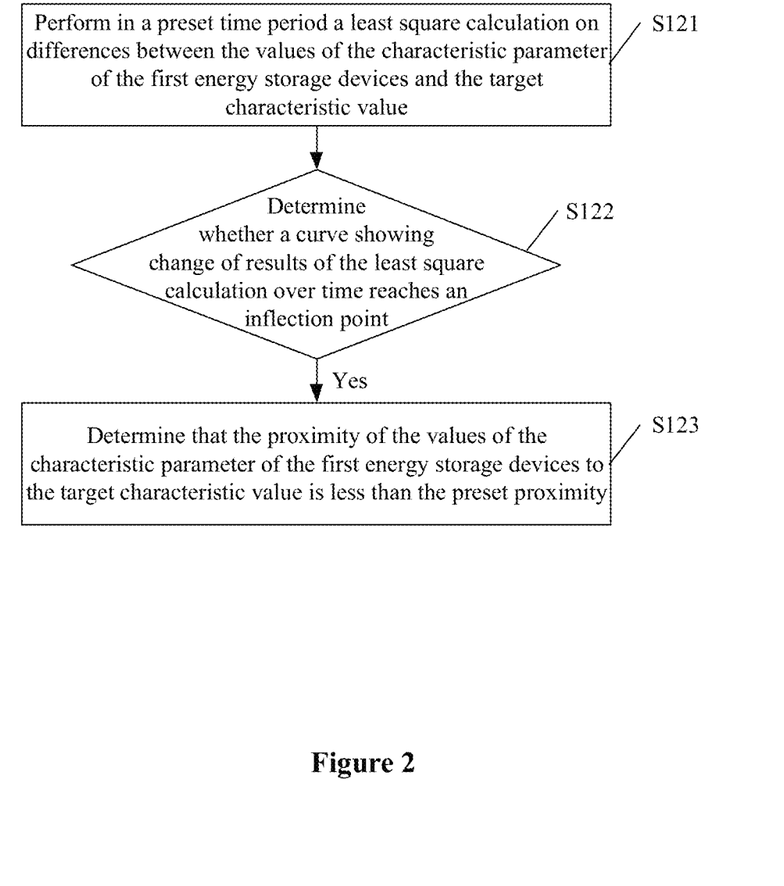
FIG. 2 is a schematic flowchart showing a specific implementation of determination carried out in step S120 of the method according to an embodiment of the present disclosure.

The other method is only applicable when the characteristic parameter is voltage. As shown in FIG. 2, if the characteristic parameter is voltage, the determining whether the proximity of a value of the characteristic parameter of the first energy storage device to the target characteristic value is less than the preset proximity, includes steps S121 to S123.

In step S121, a least square calculation is performed in a preset time period on differences between the values of the characteristic parameter of the first energy storage devices and the target characteristic value.

In step S122, it is determined whether a curve showing change of a result of the least square calculation over time reaches an inflection point.

If the curve showing change of the result of the least square calculation over time reaches the inflection point, the method proceeds to step S123; and if the curve does not reach the inflection point, the method returns to the step of controlling the charge/discharge power converter to charge or discharge the first energy storage device.

In step S123, it is determined that the proximity of the value of the characteristic parameter of the first energy storage device to the target characteristic value is less than the preset proximity.

The above two methods of determining whether the proximity of a value of the characteristic parameter of the first energy storage device to the target characteristic value is less than a preset proximity are only examples, rather than limitations.

In practical applications, the second energy storage device may be added into the energy storage system by serial connection or parallel connection.

The serial connection may be applied only when structures of the second energy storage device and the first energy storage device in the energy storage system meet a condition.

The condition includes that: the second energy storage device includes one energy storage module; and the first energy storage device in the energy storage system includes one energy storage module or at least two energy storage modules that are connected in series.

Figure 3:
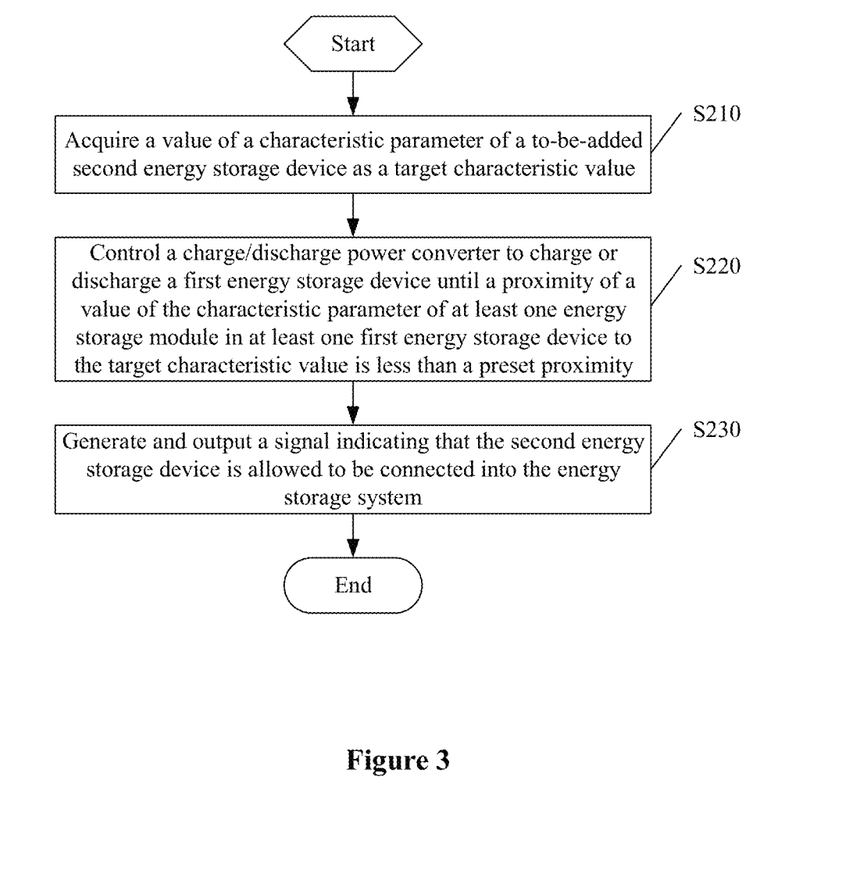
FIG. 3 and FIG. 4 are schematic flowcharts of two other methods for capacity expansion of an energy storage system according to embodiments of the present disclosure.

A method for capacity expansion of an energy storage system, by which the second energy storage device is added into the energy storage system by serial connection, is provided according to another embodiment of the present disclosure. As shown in FIG. 3, the method for capacity expansion includes steps S210 to S230.

In step S210, a value of the characteristic parameter of the second energy storage device is acquired as a target characteristic value.

Step S210 is same as Step S110, and one may refer to the description of step S110 in the aforementioned embodiment for details.

In S220, the charge/discharge power converter is controlled to charge or discharge the first energy storage device until a proximity of a value of the characteristic parameter of at least one energy storage module in at least one first energy storage device to the target characteristic value is less than a preset proximity.

If a first energy storage device includes one energy storage module, the characteristic parameter of the energy storage module is equal to the characteristic parameter of the first energy storage device, that is, the characteristic parameter may be obtained by the controller through communication with the charge/discharge power converter.

If the first energy storage device includes at least two energy storage modules connected in series, the controller may obtain the characteristic parameter of each of the energy storage modules by two ways.

A first way is to obtain the characteristic parameter of each of the energy storage modules in a first energy storage device by communicating with a management system in the first energy storage device, which is applicable to a case where the first energy storage device has a management system.

The other way is to obtain the characteristic parameter for each of the energy storage modules in a first energy storage device by equally dividing the characteristic parameter of the first energy storage device over the energy storage modules, where the characteristic parameter of the first energy storage device is obtained through communication with the charge/discharge power converter. This way is applicable to a case where the first energy storage device does not have a management system.

It should be noted that when the energy storage device is a storage battery, the management system refers to a BMS (Battery Management System).

Other parts of step S220 are the same as those of step S120, and one may refer to related descriptions in the above embodiment for details.

In step S230, a signal indicating that the second energy storage device is allowed to be connected into the energy storage system is generated and outputted.

Step S230 is same as Step S130, and one may refer to the description of step S130 in the aforementioned embodiment for details.

Figure 4:
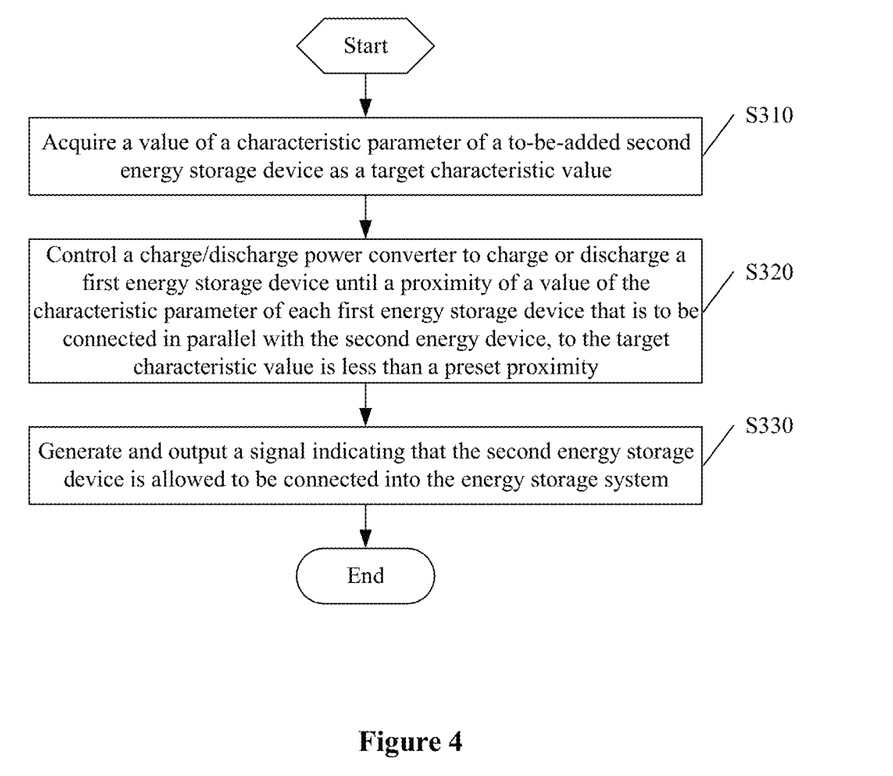

A method for capacity expansion of an energy storage system, by which the second energy storage device is added into the energy storage system by parallel connection, is provided according to another embodiment of the present disclosure. As shown in FIG. 4, the method for capacity expansion includes steps S310 to S330.

In step S310, a value of the characteristic parameter of the second energy storage device is acquired as a target characteristic value.

Step S310 is same as Step S110, and one may refer to the description of step S110 in the aforementioned embodiment for details.

However, it should be noted that in this embodiment, the characteristic parameter may be voltage, or may be voltage and any one of battery capacity and SOC, which may depend on an actual condition and is not limited herein, and all shall fall within the protection scope of the present disclosure.

In step S320, the charge/discharge power converter is controlled to charge or discharge the first energy storage device until a proximity of a value of a characteristic parameter of each first energy storage device, that is to be connected in parallel with the second energy device, to the target characteristic value is less than a preset proximity.

It should be noted that if the first and/or second energy storage devices connected in parallel have different values of the characteristic parameter, it is easy to cause damage to these energy storage devices, or even cause electrical accidents. Therefore, when adding the second energy storage device into the energy storage system by parallel connection, it is necessary to ensure that the value of the characteristic parameter of each first energy storage device to be connected in parallel with the second energy storage device is approximately the same as the target characteristic value. In addition, the characteristic parameter necessarily includes voltage. Whether to further include battery capacity or SOC in the characteristic parameter may depend on actual conditions and is not limited herein, and all shall fall within the protection scope of the present disclosure.

The other part of step S320 is the same as that of step S120, and one may refer to related descriptions in the above embodiment for details.

In step S330, a signal indicating that the second energy storage device is allowed to be connected into the energy storage system is generated and outputted.

Step S330 is same as Step S130, and one may refer to the description of step S130 in the aforementioned embodiment for details.

Figure 5:
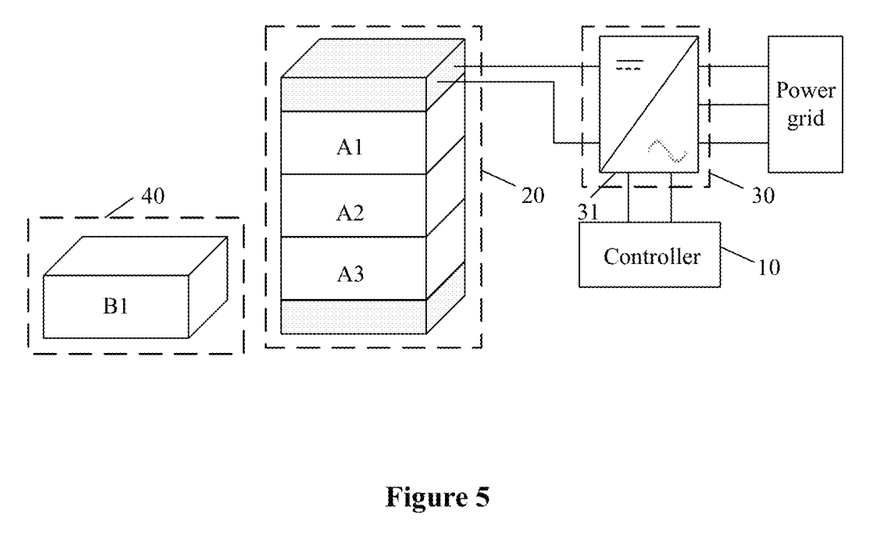
FIG. 5 is a schematic structural diagram of an energy storage system and a second energy storage device to be added.
Figure 6:
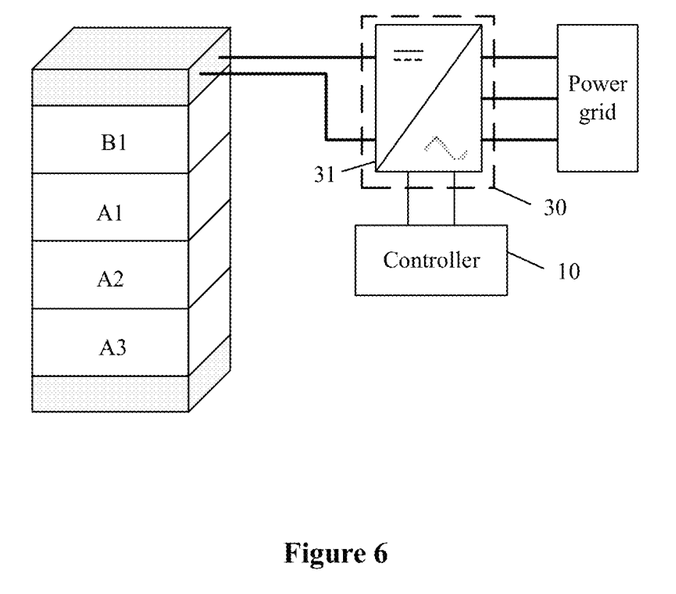
FIG. 6 is a schematic structural diagram of the energy storage system shown in FIG. 5 after capacity expansion by serial connection.

An example is shown in FIG. 5 and FIG. 6, in which a second energy storage device 40 shown on the left side of FIG. 5 is to be added into an energy storage system shown on the right side of FIG. 5 by serial connection, to obtain an expanded energy storage system as shown in FIG. 6. In order for better understanding, a detailed description of another embodiment of the method for capacity expansion of an energy storage system is provided using this example.

The energy storage system shown on the right side of FIG. 5 includes a first energy storage device 20 and a DC/AC converter 31 operating as a charge/discharge power converter 30. The first energy storage device 20 is connected to a DC side of the DC/AC converter 31, another side of the DC/AC converter 31 is connected to a power grid, and a controller 10 is in a communication connection to the DC/AC converter 31. The first energy storage device 20 includes three battery packs A1, A2, and A3. The second energy storage device 40 is shown on the left side of FIG. 5 and includes one battery pack B1.

A process of capacity expansion is described below using an example where the characteristic parameter is voltage.

The controller 10 acquires the voltage V0 of the battery pack B1, and then control the DC/AC converter 31 to switch to a capacity expansion mode. If the first energy storage device 20 does not have a management system, the controller 10 controls the DC/AC converter 31 to measure the voltage on the DC side of the DC/AC converter 31 to obtain the voltage of the first energy storage device 20, and then divides the voltage of the first energy storage device 20 by 3 to obtain an average voltage Vav of the three battery packs. If Vav>V0, the controller 10 controls the DC/AC converter 31 to discharge electrical power from the first energy storage device 20 into the power grid, to reduce the voltage of the first energy storage device 20. If Vav<V0, the controller 10 controls the DC/AC converter 31 to charge the first energy storage device 20 by the power grid, to raise the voltage of the first energy storage device 20. The described charging or discharging terminates when the absolute value of a difference between the average voltage Vav and the voltage V0 is less than 0.5. In this case, the voltage of the battery packs A1, A2, and A3 in the first energy storage device 20 is considered as being substantially same as the voltage of the battery pack B1. In this case, the energy storage system allows the capacity expansion and sends a signal.

If the first energy storage device 20 is a lithium battery having a BMS, the controller 10 may obtain the voltages V1, V2, and V3 of the battery packs A1, A2, and A3 through communication between the management system and the DC/AC converter 31. Generally, the lithium battery has an equalization system and therefore the voltages V1, V2 and V3 are almost the same. Then the first energy storage device 20 is charged or discharged until the absolute value of the difference between the voltage of at least one of V1, V2 and V3 and the voltage V0 is less than 0.5. In this case, the voltages of the battery packs A1, A2, and A3 in the first energy storage device 20 are considered as being substantially same as the voltage of the battery pack B1. Therefore, the energy storage system allows the capacity expansion and sends a signal.

In addition, when the voltage V1, V2, and V3 of the battery packs A1, A2, and A3 are obtained, the first energy storage device 20 may be charged or discharged, until curves showing a change of the result of least square calculation over time reaches an inflection point respectively, the least square calculation being performed on the difference between the voltage V1 and the voltage V0, the difference between the voltage V2 and the voltage V0, and the difference between the voltage V3 and the voltage V0. At the inflection point, it is determined that the voltage of the battery packs A1, A2, and A3 in the first energy storage device 20 are substantially the same as the voltage the battery pack B1, and therefore the capacity expansion of the energy storage system is allowed. A notification is present to the outside.

Furthermore, for example, in a case where the battery packs A1, A2, and A3 in the first energy storage device 20 have been used for three years and the battery pack B1 needs to be added at present, if the capacity expansion is performed by using voltage as the characteristic parameter, the battery packs A1, A2, and A3 will get lower power than the storage battery pack B1 when A1, A2, A3 and B1 are charged to a same terminal voltage, due to the increased internal resistance of A1, A2 and A3. That is, due to the bucket effect caused by imbalance of the SOC of the battery packs A1, A2, and A3 and the SOC of the battery pack B1, the battery packs A1, A2, and A3 cannot be fully charged.

Therefore, the available battery capacity of the energy storage system cannot be fully used. In view of this, the capacity expansion may be performed by using the SOC or battery capacity as the characteristic parameter.

Figure 7:
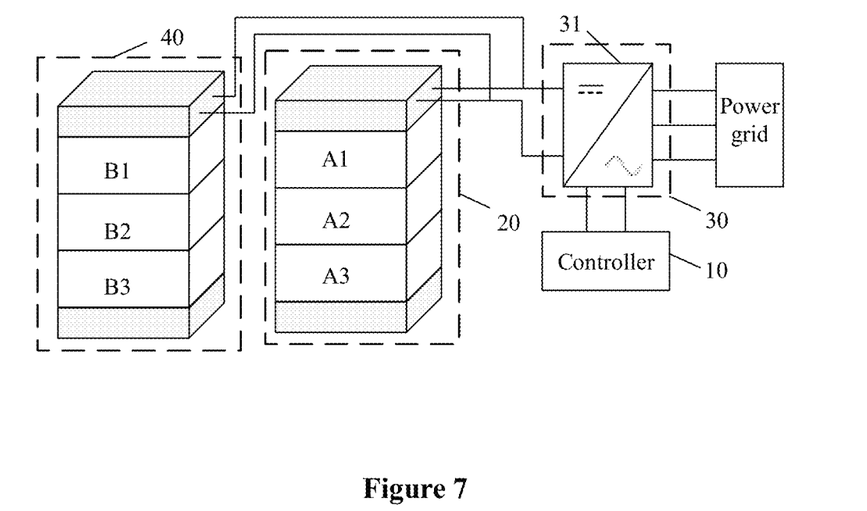
FIG. 7 is a schematic structural diagram of an energy storage system shown in FIG. 5 after expansion by parallel connection.

In addition, it should be noted that if the second energy storage device 40 includes battery packs B1, B2, and B3, the second energy storage device 40 may be added into the energy storage system by parallel connection. A process of such capacity expansion is similar to the above-mention process, the description of which is not repeated herein. The energy storage system after capacity expansion by the parallel connection is shown in FIG. 7. It should be noted that the voltage across the first energy storage device 20 should be the same as the voltage across the second energy storage device 40.

It can be seen from the embodiments that the characteristic parameter may be at least one of voltage, battery capacity and SOC. If the characteristic parameter is voltage, the characteristic parameter may be obtained by measuring when the second energy storage device is on-site. If the characteristic parameter is battery capacity or SOC, the characteristic parameter may be obtained by measuring on-site, or preferably obtained from factory-provided information of the second energy storage device, which can reduce the cost and difficulty for measurement.

Considering that the voltage, battery capacity, or SOC of the second energy storage device does not change significantly over a long period of time, such as 30 days, which can cover a period of time normally required for transportation from factory and charge/discharge of the energy storage system in the capacity expansion mode, the factory-provided information may include the characteristic parameter of the second energy storage device. In this case, the value of the characteristic parameter of the second energy storage device is its factory-provided value, that is, a value of the characteristic parameter measured before the second energy storage device is delivered by a factory or transferred from a warehouse. For example, the measure value of the characteristic parameter may include voltage=51.2 v, battery capacity=92 Ah (or 4.7 KWh), or SOC=92%.

However, considering some special circumstances such as transportation delays or installation delays, the factory-provided information may further include the date of production and a formula for calculating the characteristic parameters of the second energy storage device in relation to time.

The formula for calculating the characteristic parameters of the second energy storage device in relation to time may be expressed as: target characteristic value=f(factory-provided value, time period), where f( ) is a preset function indicating a relationship of the target characteristic value, the factory-provided value and the time period.

The characteristic parameters and the date of production in the factory information may be attached to an internal body or external surface of the second energy storage device, or attached inside a package or on the external surface of the package, for example, in a form of a bar-code or a two-dimensional code; or may be recorded in a mobile phone APP, which may depend on specific situations and is not limited herein. Any method for storing the factory-provided information shall fall within the protection scope of the present disclosure.

A method for obtaining information of the characteristic parameter and the date of production may be introduced in a manual. For example, if the information is attached to the external surface of the body of the second in the form of a bar-code or two-dimensional code, the parameter may be obtained at the installation site through the mobile phone APP or automatically by scanning the code, which is conventional in the art, and is not described in detail herein.

In some embodiments, the formula for calculating the characteristic parameter of the second energy storage device over time together with a use guide may be recorded in the manual. For example, at the installation site, a factory-provided value of the characteristic parameter and the date of production may be entered into a mobile phone APP by scanning the barcode. Then, the formula may be entered into the mobile phone APP according to instructions recorded in the manual. Then, the mobile phone APP calculates the target characteristic value based on the formula, the factory-provided value of the characteristic parameter, the date of production and the present time, and input the target characteristic value into the energy storage system. Alternatively, the formula may be previously input into the mobile phone APP. For example, the formula may be input into the mobile phone APP before delivery. In this case, when the factory-provided value of the characteristic parameter and the date of production are input into the mobile phone APP at the installation site, the mobile phone APP can calculate the target characteristic value based on the formula, the factory-provided value of the characteristic parameter, the date of production and the present time.

Figure 8:
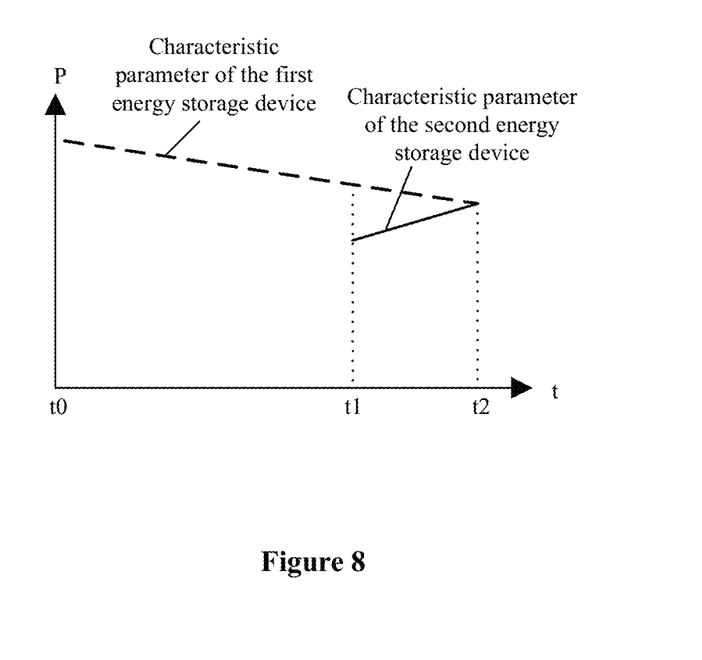
FIG. 8 is a schematic diagram showing change of a characteristic parameter of a first energy storage device over time and change of a characteristic parameter of a second energy storage device over time.

It should be noted that another formula for calculating the target characteristic value is also recorded in the manual for a case where the charging or discharging time for the energy storage system in the capacity expansion mode exceeds a preset time due to that, for example, the load is less than a preset value so as to require a long time for charging or discharging the first energy storage device, or that the power grid fails to provide power to charge the first energy storage device. An example is shown in FIG. 8.

When the to-be-added second energy storage device arrives at the installation site at time t1, the factory-provided value of the characteristic parameter and the date of production of the second energy storage device are sent to the energy storage system through the mobile phone APP. The energy storage system calculates a preliminary target value based on the factory-provided value of the characteristic parameter to control the charge or discharge of the first energy storage device, and calculates a new target value based on the time used for the charge or discharge, to adjust the control of charge or discharge, which is repeated until a time t2 when the difference between a value of the characteristic parameter of at least one first energy storage device and the last calculated target value is less than a threshold, indicating that the capacity expansion of the energy storage system is allowed.

It should be noted that a major advantage of calibrating and providing the characteristic parameters in factory or warehouse is that a batch measurement and management may be performed. For example, the characteristic parameters of all batteries to be delivered are calibrated to have a same value of the characteristic parameters. For example, battery voltage=51.2V, battery capacity=92 Ah (or 4.7 KWh) or SOC=92%. Therefore, the batteries do not need to be calibrated separately. Therefore, the cost is greatly reduced.

In practical applications, all the second energy storage devices to be added may be grouped according to the characteristic parameter. That is, the second energy storage devices having the same value of the characteristic parameter may be added into the energy storage system together by the above method for capacity expansion. If all the second energy storage devices to be added have the same value of the characteristic parameter, they may be added to the energy storage system at one time. If the second energy storage devices have different values of the selected characteristic parameter, the second energy storage devices are added to the energy storage system in batches, under a condition that only one target characteristic value is used for each batch capacity expansion. Details of which are not described herein.

The above describes various embodiments of the method for capacity expansion of an energy storage system. An energy storage system for implementing the embodiments of the method for capacity expansion is further provided. FIG. 5 shows a specific structure of the energy storage system, including: a controller 10, at least one first energy storage device 20 (only one is shown), at least one charge/discharge power converter 30 (only a DC/AC converter 31 is shown as an example), and at least one second storage device 40 to be added into the energy storage system.

In the energy storage system, each first energy storage device 20 is connected to a DC side of a corresponding charge/discharge power converter 30, and the other side of the charge/discharge power converter 30 is connected to an external power supply and/or an external load.

The controller 10 is in a communication connection with the charge/discharge power converter 30, and is configured to execute the method for capacity expansion provided in the foregoing embodiments, so as to add the second energy storage device 40 into the energy storage system.

It should be noted that the charge/discharge power converter 30 in the energy storage system may be a DC/AC converter or a DC/DC converter, any of which is a bidirectional converter and works in both directions.

In some embodiments, if the charge/discharge power converter 30 is a DC/AC converter 31 (as shown in FIG. 5), the other side of the charge/discharge power converter 30 is an AC side, connected to an AC power supply (as shown in FIG. 5) and/or an AC load, which may depend on a specific situation and is not limited herein, and shall fall within the protection scope of the present disclosure.

Figure 9:
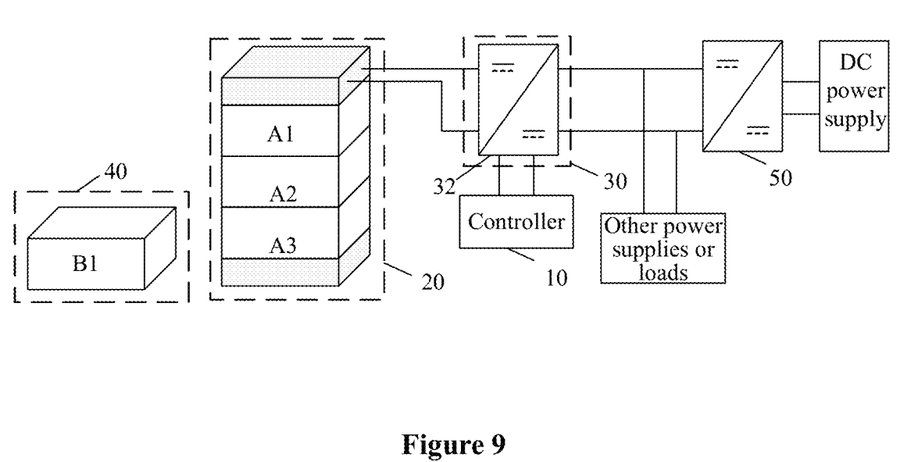
FIG. 9 is a schematic structural diagram of an energy storage system according to an embodiment of the present disclosure.

In some embodiments, if the charge/discharge power converter 30 is a DC/DC converter 32, the other side of the charge/discharge power converter 30 is a DC side, connected to a DC power supply (as shown in FIG. 9) and/or a DC load through another DC/DC converter 50. When the first energy storage device 20 needs to be charged or discharged in the capacity expansion mode, the energy storage system may use the DC/DC converter 50 to transfer energy of the first energy storage device 20 to the outside, or transfer energy from a DC power supply to the first energy storage device 20. Additionally or alternatively, the other side of the charge/discharge power converter 30 is connected to an AC power supply and/or an AC load through a DC/AC converter. A specific implementation thereof may depend on a specific situation and is not limited herein, and shall fall within the protection scope of the present disclosure.

It should be noted that when the charge/discharge power converter 30 is a DC/DC converter 32, the other side of the DC/DC converter 32 may also be directly connected to a DC power supply or a DC load (as shown in FIG. 9), which may be combined with any of the above methods, but is not limited herein, and all shall fall within the protection scope of the present disclosure.

In addition, it should be noted that more power supplies or loads in the energy storage system may lead to more flexible the control of charging or discharging the first energy storage device.

It should be noted that the DC power supply may be a photovoltaic module or energy storage device, which depends on a specific situation and is not limited herein, and all shall fall within the protection scope of the present disclosure. The AC power source may be a power grid or AC generator, which depends on a specific situation and is not limited herein, and all shall fall within the protection scope of the present disclosure.

The controller 10 may be an internal controller of the charge/discharge power converter 30 or a system controller, which depends on a specific situation and is not limited herein, and all shall fall within the protection scope of the present disclosure.

The embodiments in the present disclosure are described in a progressive manner, each of which mainly focuses on describing its differences from other embodiments, and references may be made among these embodiments with respect to the same or similar parts. The apparatuses disclosed in the embodiments are corresponding to the methods disclosed in the embodiments and therefore are only briefly described, and reference may be made to the descriptions of the methods for the relevant part.

The foregoing embodiments are only preferred embodiments of technical solutions in the present disclosure. Preferred embodiments of the present application are disclosed above, and are not intended to limit the present application. With the method and technical content disclosed above, those skilled in the art can make some variations and improvements to the technical solutions of the present disclosure, or make some equivalent variations on the embodiments without departing from the scope of technical solutions of the present disclosure. Therefore, without departing from the content of the technical solution of the present application, any simple modifications, equivalents, and modifications made to the above embodiments according to the technical essential of the present application shall fall within the protection scope of the technical solution of the present application.

The invention claimed is:

1. A method for capacity expansion of an energy storage system, applied to a controller in the energy storage system, the energy storage system further comprising one or more first energy storage devices, a charge/discharge power converter, and one or more second energy storage devices to be added into the energy storage system, wherein the one or more second energy storage devices have a same value of a characteristic parameter, the method comprises:

acquiring the value of the characteristic parameter of the second energy storage devices as a target characteristic value;

controlling the charge/discharge power converter to charge or discharge the first energy storage devices until a proximity of a value of the characteristic parameter of at least one of the first energy storage devices to the target characteristic value is less than a preset proximity; and generating and outputting a signal indicating that the second energy storage devices are allowed to be connected into the energy storage system, after the controlling the charge/discharge power converter, wherein each of the second energy storage devices comprises one energy storage module, and each of the first energy storage devices comprises one storage module or at least two storage modules connected in series, and the second energy storage devices are to be added by serial connection, the controlling the charge/discharge power converter to charge or discharge the first energy storage devices until a proximity of a value of the characteristic parameter of at least one of the first energy storage devices to the target characteristic value is less than a preset proximity comprises:

controlling the charge/discharge power converter to charge or discharge the first energy storage devices until the proximity of the value of the characteristic parameter of at least one energy storage module in at least one of the first energy storage devices to the target characteristic value is less than the preset proximity.

2. The method for capacity expansion of an energy storage system according to claim 1, wherein in a case that one of the first energy storage devices comprises at least two energy storage modules connected in series, the value of the characteristic parameter of each of the energy storage modules in the first energy storage device is acquired by:

communicating with a management system in the first energy storage device; or equally averaging the value of the characteristic parameter of the first energy storage device over the energy storage modules and taking the averaged value as the value of the characteristic parameter of one energy storage module.

3. The method for capacity expansion of an energy storage system according to claim 1, wherein the first energy storage devices and the second energy storages device are storage batteries, and the characteristic parameter is at least one of voltage, battery capacity, and state of charge, SOC.

4. The method for capacity expansion of an energy storage system according to claim 3, wherein the proximity is an absolute value of difference, and the preset proximity is a preset threshold.

5. The method for capacity expansion of an energy storage system according to claim 3, wherein in a case that the characteristic parameter is voltage, whether the proximity of values of the characteristic parameter of the first energy storage devices to the target characteristic value is less than the preset proximity is determined by:

performing, in a preset time period, a least square calculation on differences between the values of the characteristic parameter of the first energy storage devices and the target characteristic value;

determining whether a curve showing change of a result of the least square calculation over time reaches an inflection point; and determining that the proximity is less than the preset proximity if the curve reaches the inflection point.

6. The method for capacity expansion of an energy storage system according to claim 3, wherein in a case that the characteristic parameter is battery capacity or SOC, the target characteristic value is obtained from factory-provided information of the second energy storage devices.

7. The method for capacity expansion of an energy storage system according to claim 6, wherein the factory-provided information comprises the characteristic parameter, or the factory-provided information comprises the characteristic parameter, date of production and a formula for calculating the characteristic parameter over time.

8. The method for capacity expansion of an energy storage system according to claim 1, wherein the controlling the charge/discharge power converter to charge or discharge the first energy storage devices comprises:

controlling the charge/discharge power converter to charge one of the first energy storage devices if a value of the characteristic parameter of the first energy storage device is less than the target characteristic value; and controlling the charge/discharge power converter to discharge one of the first energy storage device if a value of the characteristic parameter of the first energy storage device is greater than the target characteristic value.

9. The method for capacity expansion of an energy storage system according to claim 1, further comprising:

controlling, after the second energy storage devices are added into the energy storage system, the charge/discharge power converter to perform deep charge/discharge and SOC re-calibration on the first energy storage devices and the added second energy storage devices.

10. An energy storage system, comprising: a controller, a first energy storage device, a charge/discharge power converter, and a second energy storage device which is to be added into the energy storage system, wherein:

the first energy storage device is connected to a direct current, DC, side of the charge/discharge power converter;

the controller is in a communication connection with the charge/discharge power converter, and the controller is configured to execute the method according to claim 1, to add the second energy storage device into the energy storage system.

11. The energy storage system according to claim 10, wherein in a case that the charge/discharge power converter is a DC/AC converter, another side of the charge/discharge power converter is an AC side connected to an AC power supply and/or an AC load.

12. The energy storage system according to claim 10, wherein in a case that the charge/discharge power converter is a DC/DC converter, another side of the charge/discharge power converter is a DC side connected to a DC power supply and/or a DC load, via another DC/DC converter, and/or another side of the charge/discharge power converter is a DC side connected to an AC power supply and/or an AC load, via a DC/AC converter.

13. The energy storage system according to claim 12, wherein the DC power supply is a photovoltaic module or an energy storage device.

14. The energy storage system according to claim 11, wherein the AC power supply is a power grid or an AC generator.

15. The energy storage system of claim 10, wherein the controller is:

an internal controller of the charge/discharge power converter, or a system controller.

* * * * *